Figure 1:
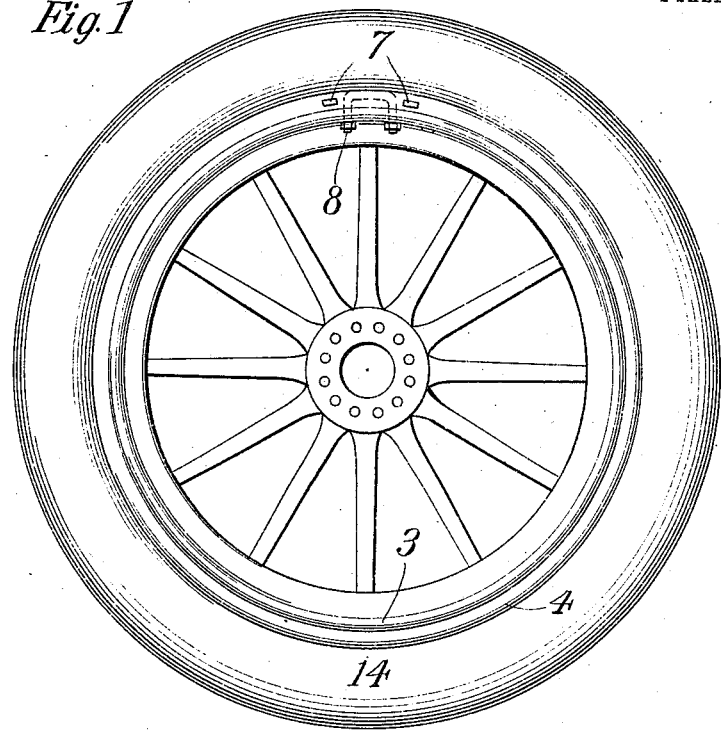

No. 764,140. PATENTED JULY 5. 1904.
T. MIDGLEY.
VEHICLE WHEEL.
APPLICATION FILED AUG. 19, 1903.
NO MODEL. 2 SHEETS—SHEET 1.

Witnesses:
Thomas J. Surplus
H. Richard Wöbse

Inventor
Thomas Midgley
by Ernest Hopkinson, his Att'y.

No. 764,140. PATENTED JULY , 1904.
T. MIDGLEY.
VEHICLE WHEEL.
APPLICATION FILED AUG. 19, 1903.
NO MODEL. 2 SHEETS—SHEET 2.

Witnesses:

Inventor
Thomas Midgley.
by Ernest Hopkinson, his Att'y.

No. 764,140.

Patented July 5, 1904.

UNITED STATES PATENT OFFICE.

THOMAS MIDGLEY, OF COLUMBUS, OHIO, ASSIGNOR TO HARTFORD RUBBER WORKS COMPANY, A CORPORATION OF CONNECTICUT.

VEHICLE-WHEEL.

SPECIFICATION forming part of Letters Patent No. 764,140, dated July 5, 1904.

Application filed August 19, 1903. Serial No. 170,092. (No model.)

*To all whom it may concern:*

Be it known that I, THOMAS MIDGLEY, a citizen of the United States, residing at Columbus, in the county of Franklin and State of Ohio, have invented certain new and useful Improvements in Vehicle-Wheels; and I do hereby declare the following to be a full, clear, and exact description of the invention, such as will enable others skilled in the art to which it appertains to make and use the same.

This invention relates to vehicle-wheels adapted to be used in connection with an elastic tire, and particularly a pneumatic tire.

The main field of utility of the invention resides in vehicle-wheels for comparatively heavy vehicles, such as automobiles and the like as distinguished from bicycles, one object of the invention being to provide means whereby a heavy tire may be readily disassociated from the wheel-rim for the purpose of repair or otherwise.

As is well known, there are two forms of pneumatic tires most generally in use on vehicles, in both of which there is an inner tube confining the air and an outer cover or wearing-shoe which affords the resistance to the inflation-pressure of the air-tube and also provides the traction-surface. In one of these forms the edges of the wearing-shoe are each provided with a circumferential wire of a fixed diameter, which confines the edge of the tire to the diameter determined by it. In the other form of tire a bead is formed along each edge of the cover, which bead engages with a turned-in portion of the rim and is maintained in engagement by the pressure of inflation. In both these types of tires as at present constructed it is extremely difficult to take off and replace the outer shoe, even though the circumference of the edge of the shoe is greater than that of the rim periphery. By the present invention I provide means whereby the removal and replacement of the tire are greatly facilitated, while the tire-shoe may have an inextensible edge of a diameter to fit and rest on the periphery of the rim.

In the drawings I have illustrated various constructions embodying my invention.

Figure 2:
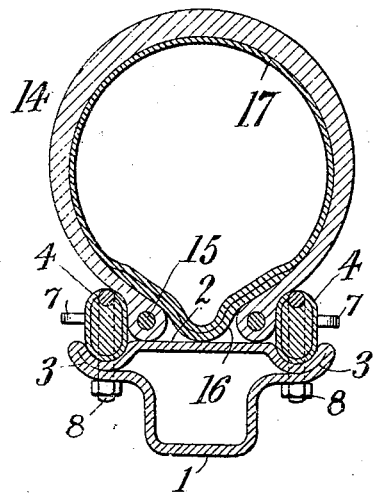
Figure 3:
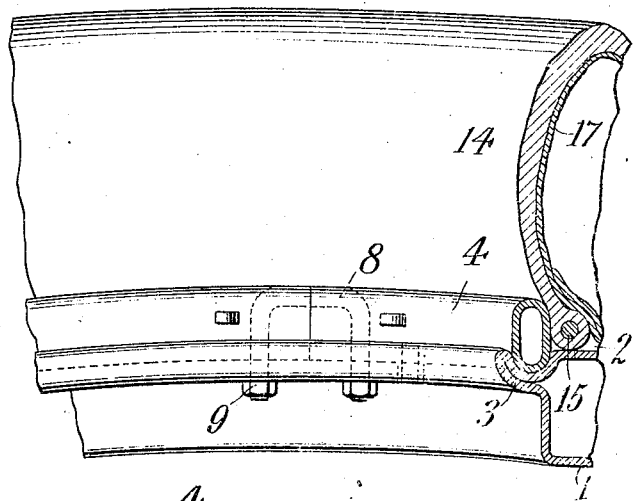
Figure 4:
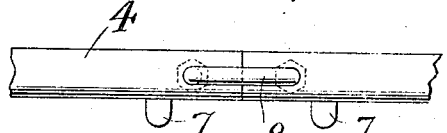
Figure 5:
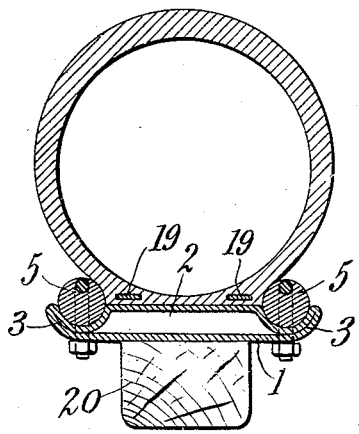
Figure 6:
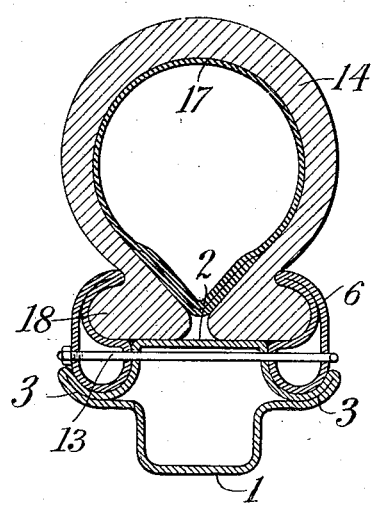
Figure 7:
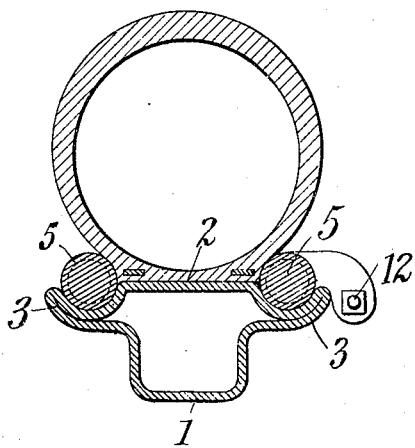
Figure 8:
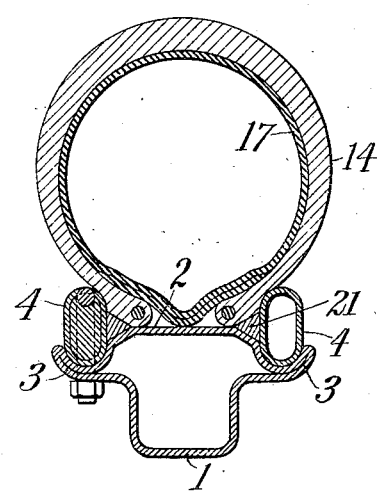
Figure 9:
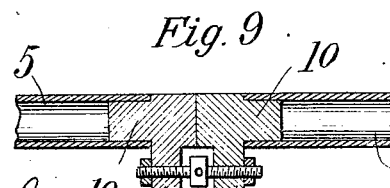

In the drawings, Figure 1 is a side elevation of a wheel made according to my invention. Fig. 2 is a cross-section of a rim provided with a tire having inextensible edges. Fig. 3 is a view, partly in cross-section and partly in side elevation, showing a similar tire to that illustrated in Fig. 2. Fig. 4 is a top plan view of the fastening device for the side flange shown in Fig. 3. Figs. 5, 6, 7, and 8 are cross-sectional views, Fig. 5 illustrating a single-tube tire and a rim used in connection with a wooden felly, Fig. 6 showing a type of tire in which the shoe has beaded edges and a rim construction adapted to have metal spokes directly attached thereto, Fig. 7 showing a similar form of rim to that shown in Fig. 6 and illustrating a single-tube tire, while Fig. 8 illustrates a modification. Fig. 9 shows in longitudinal cross-section the abutting ends and method of securing the removable flange.

Like figures of reference refer to like parts throughout the several views of the drawings.

Considering the drawings in detail and referring first to the rim, it is to be noted that there are two forms shown, one illustrated in Fig. 5, where it is associated with a wooden felly, and the other shown in Figs. 2, 3, 5, 6, 7, and 8, where it is shown as adapted for use without a wooden felly, the spokes being secured directly thereto. This rim is preferably made of sheet metal and has its inner surface 1, which for convenience I call the "hub-face," and its peripheral surface 2 (here called the "tire-face") spaced apart centrally, the two portions—namely, the hub and tire surface—being closed upon each other at each side of the tire-seat and formed into a flange-seating portion 3, here shown as consisting of a channel or groove. It is important that the flange-seating portion of the rim should not project substantially above the tire-face of the rim, and, on the other hand, it is important that the under surface of this flange-seating portion should not project toward the hub within the circumference of the hub-face of the rim. The reason the flange-seating portion should not project above the tire-face of the rim is that whatever form of tire may be used in connection with the rim it is very desirable that the diameter of the inner surface of the tire, or in the case of a tire having a wearing-shoe the diameter of the inextensible edges thereof, should be of substantially the same diameter as the tire-surface of the rim. If any part of the groove or flange-seating portion should project above the tire-surface, it would to that extent militate against the ready removal and replacement of the tire. On the other hand, if the under surface of the flange-seating portion should extend within the hub-face of the rim it would render it impossible to shrink the rim on a wooden felly. Where a wooden felly is not used, in order to secure the spokes in the rim and leave room for some form of securing devices in the space between the hub and tire faces it is desirable to have a metal equivalent of the wooden felly extending farther toward the hub than the bottom of the flange-seating portion of the rim. Besides, this method of constructing the rim out of sheet metal and leaving a space between the tire-face and hub-face and closing them on each other to form a grooved or flange-seating portion of the rim permits of great strength, while at the same time minimizes the weight of metal.

Referring now to the side flange, this may be made solid or hollow and given any conformation adapted to the style of tire with which it is used. This side flange, which is shown as hollow and elliptical in cross-section in Figs. 2, 3, 4, and 8, is designated by the numeral 4. In Figs. 5 and 7 the side flange (designated by the numeral 5) is shown as circular in cross-section and in Fig. 5 as being solid, while in Fig. 6 the side flanges (designated by the numeral 6) are shown as provided with turned-in edges to engage with the beads of a tire-cover having a beaded edge; but whatever may be the peculiar construction of the side flange, whether solid or tubular, it is made removable by providing means for increasing its diameter, so that it may be passed over the outer edge of the flange-seating portion of the rim. In practice I make the flange a broken ring and provide means at the abutting faces of the ring whereby they may be drawn and held together to tightly hug the flange-seating portion of the rim. In Figs. 1, 2, 3, and 4 I have shown the side flange as provided with lugs 7 adjacent the break in the ring, these lugs being for the purpose of providing engaging means whereby a suitable tool may be applied to draw the ends together and a staple 8 inserted vertically through the side flange and the seating portion of the rim and there secured in any manner, as by nuts 9. In Figs. 7 and 9 I have shown the side flange as provided with plugs 10, secured in any desired manner in the opposed ends of the side flange, these plugs each being provided with a projection 11, engaged by a turnbuckle 12. In Fig. 6 I have shown the side flange as provided with a turned-in portion adapted to engage the bead of the type of tire there shown, the flanges in this instance being additionally secured by tie-rods 13. It is immaterial what means are used for increasing or decreasing the diameter of the removable flange; but a turnbuckle construction will probably be found the most practicable and easy of manufacture. It will also be apparent that only one of the side flanges need be made removable.

It will be readily seen that with this construction a desirable object in tire-making may be obtained—namely, that the edges of the cover in a double-tube tire may be made of substantially the same diameter as the outer rim, by which I mean such a diameter as will snugly fit the periphery of the rim, and at the same time the edges of the cover may be made inextensible, so as to positively resist the outward pull due to the inflation of the tire. Where a cover or shoe of a tire is made with edges having a greater diameter than the periphery of the rim of the wheel to which it is applied, it is of course desirable that the inflation of the tire shall cause the edge of the shoe to be equidistant from the periphery of the rim throughout the entire circumference; but in practice it often happens that the edge of the tire will seat on the rim at one point and at a diametrically opposite point will be twice the proper distance from the periphery, this latter condition causing many accidents, such as the blowing out of the inner tube or the total displacement of the tire from the rim. By my construction the edge of the shoe may be made so as to fit the rim closely all around and render impossible the accidents just referred to.

In Figs. 2, 3, and 8 I have shown a tire comprising a wearing shoe or cover 14, having embedded in its edges wires 15, so as to make the edges of the cover inextensible, the cover also being provided with a flap 16. 17 designates the usual inner tube. In Fig. 6 the edges of the cover are provided with beads 18, engaging the turned-over edges of the side flanges.

In Figs. 5 and 7 I have shown a single-tube tire having metal bands 19 embedded in the base. In Fig. 5 there is shown a wooden felly 20. It is of course understood that this arrangement of metal rim and wood felly (illustrated in Fig. 5) may be used in connection with any type of tire.

In Fig. 8 I have shown a cross-section in which there are illustrated annular corner-pieces 21, these corner-pieces serving to form part of the tire-seat.

What is claimed as new is—

1. In a vehicle-wheel, a rim adapted for use with an elastic tire, said rim having an outer tire-face and an inner flat hub-face and having also a flange-seating portion which does not project beyond either the said tire or hub faces, a side flange for said rim, and means for varying the circumference of said flange to effect the engagement and disengagement thereof with the flange-seating portion.

2. In a vehicle-wheel, a rim having an outer tire-face and an inner flat hub-face and having also a grooved flange-seating portion the bottom of which is located level with or above the said hub-face, and a side flange removably secured in said flange-seating portion.

3. In a vehicle-wheel, a felly, a rim located thereon, said rim having an outer tire-face and an inner flat hub-face, and having also a grooved flange-seating portion the bottom of which is located level with or above the periphery of the felly, and a side flange removably secured in said flange-seating portion.

4. In a vehicle-wheel, a felly, a rim secured thereon, said rim having an outer tire-face and an inner flat hub-face and having also a grooved flange-seating portion the bottom of which is located level with or above the said hub-face, a side flange for said rim, and means for varying the circumference of said flange to effect the engagement and disengagement thereof with the flange-seating portion.

5. In a vehicle-wheel, a rim having an outer tire-face and an inner flat hub-face, a pneumatic tire having inextensible edges of substantially the same diameter as the said tire-face, a flange-seating portion of said rim which does not project beyond either the tire or the hub faces thereof, a side flange for said rim, and means for varying the circumference of said flange to effect engagement and disengagement with the flange-seating portion.

6. In a vehicle-wheel, a rim comprising a portion having a tire-face and another portion having a hub-face, said two portions being centrally spaced apart and closed together on one or both sides to constitute a flange-seating portion.

7. In a vehicle-wheel, a rim adapted for use with an elastic tire, said rim having an outer tire-face and an inner flat hub-face and having also a flange-seating portion which does not project beyond either the said tire or hub faces, a flange for said rim, said flange consisting of a broken ring, and a turnbuckle engaging the ends of said side flange to vary its circumference.

8. In a vehicle-wheel, a felly, a rim located thereon having a flat hub-face and a grooved flange-seating portion the bottom of which is located level with or above the periphery of the felly, and a side flange consisting of a broken ring provided with means for varying its circumference.

9. In a vehicle-wheel, a rim comprising a portion having a tire-face and another portion having a hub-face, said two portions being centrally spaced apart and closed together on one or both sides to constitute a flange-seating portion, one or more removable side flanges for said rim, and a pneumatic tire having inextensible edges of substantially the same diameter as the said tire-face.

In testimony whereof I affix my signature in presence of two witnesses.

THOMAS MIDGLEY.

Witnesses:
  PARNELL CULL,
  FRED. MIDGLEY.